(12) United States Patent
Yelahanka Raghuprasad et al.

(10) Patent No.: US 11,909,803 B1
(45) Date of Patent: Feb. 20, 2024

(54) APPLICATION SELECTION BASED ON NETWORK CHARACTERISTICS

(71) Applicant: Cisco Technology, Inc., San Jose, CA (US)

(72) Inventors: Mukund Yelahanka Raghuprasad, San Jose, CA (US); Grégory Mermoud, Venthône (CH); Jean-Philippe Vasseur, Combloux (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 18/205,071

(22) Filed: Jun. 2, 2023

(51) Int. Cl.
*H04L 65/80* (2022.01)
*H04L 65/403* (2022.01)
*H04L 41/5067* (2022.01)
*H04L 41/16* (2022.01)
*H04L 67/75* (2022.01)

(52) U.S. Cl.
CPC .............. *H04L 65/80* (2013.01); *H04L 41/16* (2013.01); *H04L 41/5067* (2013.01); *H04L 65/403* (2013.01); *H04L 67/75* (2022.05)

(58) Field of Classification Search
CPC ....................................................... H04L 65/80
See application file for complete search history.

(56) References Cited

U.S. PATENT DOCUMENTS

| | | | |
|---|---|---|---|
| 9,414,248 B2 | 8/2016 | Kovvali et al. | |
| 9,680,767 B2 * | 6/2017 | Karthikeyan | H04L 47/825 |
| 10,284,635 B2 | 5/2019 | Yang et al. | |
| 10,862,771 B2 | 12/2020 | Tomkins et al. | |
| 11,411,845 B1 | 8/2022 | Faisal Padinjareveetil et al. | |
| 11,652,691 B1 * | 5/2023 | Ramalingam | H04L 43/0888 709/221 |
| 2016/0135104 A1 * | 5/2016 | Lau | H04W 88/12 455/436 |
| 2017/0288986 A1 * | 10/2017 | Van Oost | H04W 24/02 |
| 2021/0204011 A1 * | 7/2021 | Jain | H04L 65/80 |
| 2023/0018772 A1 | 1/2023 | Kolar et al. | |
| 2023/0129290 A1 * | 4/2023 | Kolar | H04L 41/5009 709/224 |

* cited by examiner

*Primary Examiner* — Clayton R Williams
(74) *Attorney, Agent, or Firm* — BEHMKE INNOVATION GROUP LLC; James M. Behmke; James J. Wong

(57) ABSTRACT

In one embodiment, a device may identify a plurality of impairment scenarios for a network. The device may estimate quality of experience metrics for a plurality of applications accessible via the network for each of the plurality of impairment scenarios. The device may select a particular application from among the plurality of applications based on a comparison between the quality of experience metrics for the plurality of applications. The device may provide an indication for presentation by a user interface that a user should use the particular application from among the plurality of applications.

20 Claims, 11 Drawing Sheets

APPLICATION SELECTION BASED ON NETWORK CHARACTERISTICS

TECHNICAL FIELD

The present disclosure relates generally to computer networks, and, more particularly, to application selection based on network characteristics.

BACKGROUND

Traditionally, network administrators have used service level agreements (SLAs) as a proxy for the quality of experience (QoE) of online applications from the standpoint of their users. These SLAs take the form of thresholds for various network characteristics, such as delay, loss, jitter, etc., and are viewed as the dividing lines between acceptable application experience or degraded application experience. For instance, in the case of voice applications, the usual SLA boundaries are 150 ms for delay, 50 ms for jitter, and maximum of 3% packet loss. This is typically done for each class/type of application of interest (e.g., videoconferencing, audio, etc.).

One observation herein is that different applications of the same type often provide different QoE to their users, depending on the state of the network. This can be due to various application-specific factors such as how they process media streams, which media codes they use, their compression capabilities, and the like. For instance, one voice application that uses a lossy codec such as Opus may be resistant to packet loss up to 30%, whereas another application that uses a different codec, such as advanced audio coding (AAC), are usually not resilient to such high loss thresholds.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
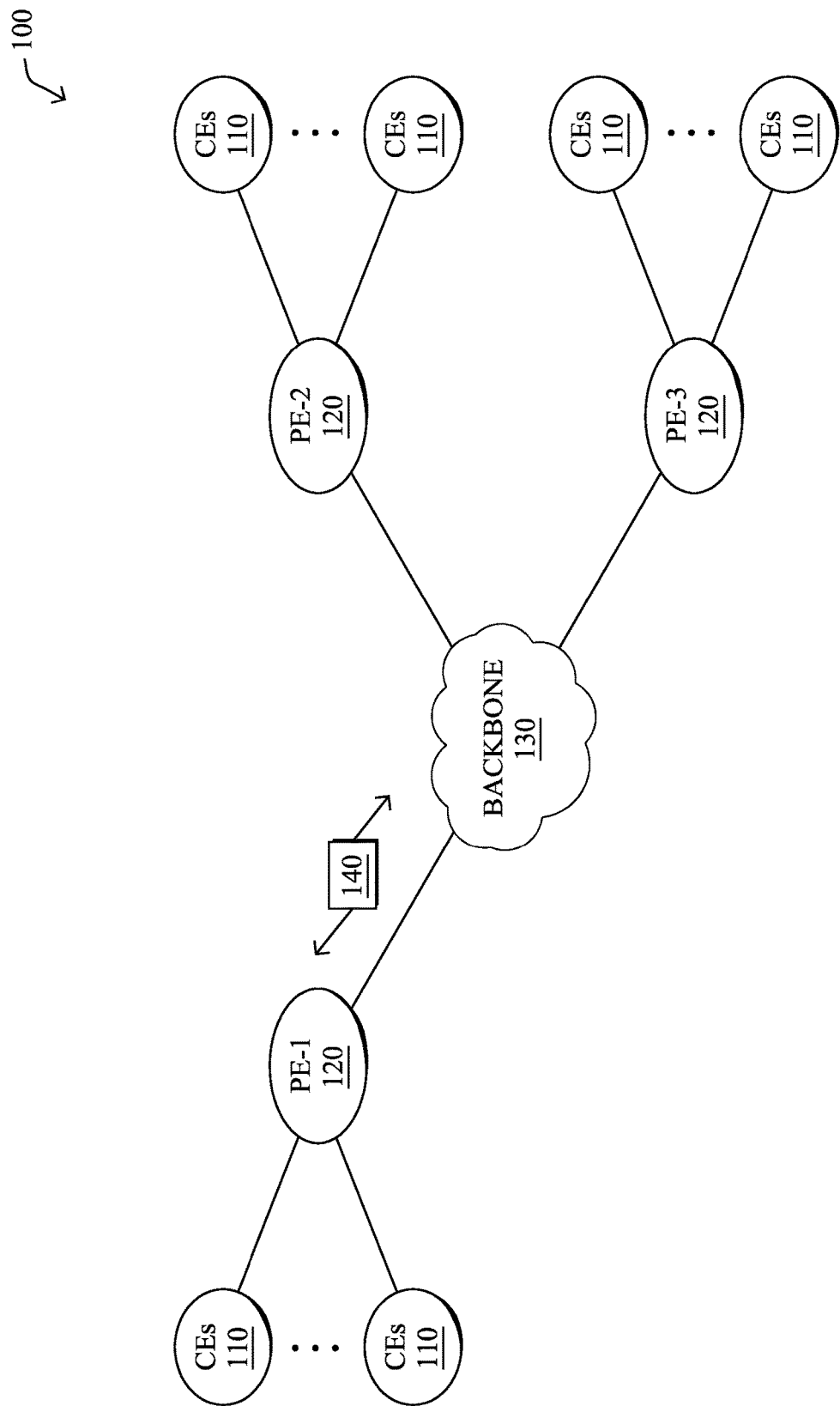
FIGS. 1A-1B illustrate an example communication network.

According to one or more embodiments of the disclosure, a device may identify a plurality of impairment scenarios for a network. The device may estimate quality of experience metrics for a plurality of applications accessible via the network for each of the plurality of impairment scenarios. The device may select a particular application from among the plurality of applications based on a comparison between the quality of experience metrics for the plurality of applications. The device may provide an indication for presentation by a user interface that a user should use the particular application from among the plurality of applications.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
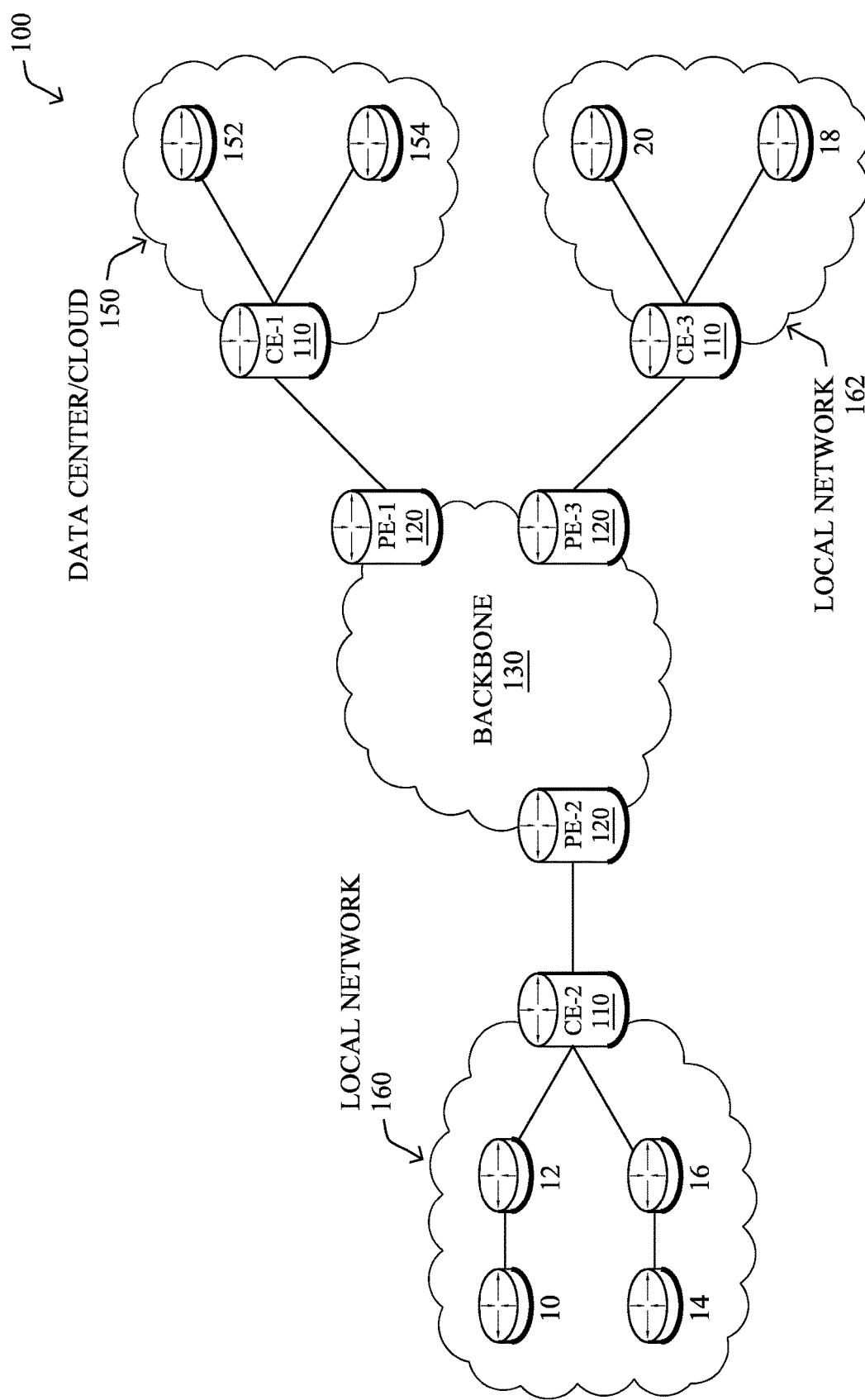

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
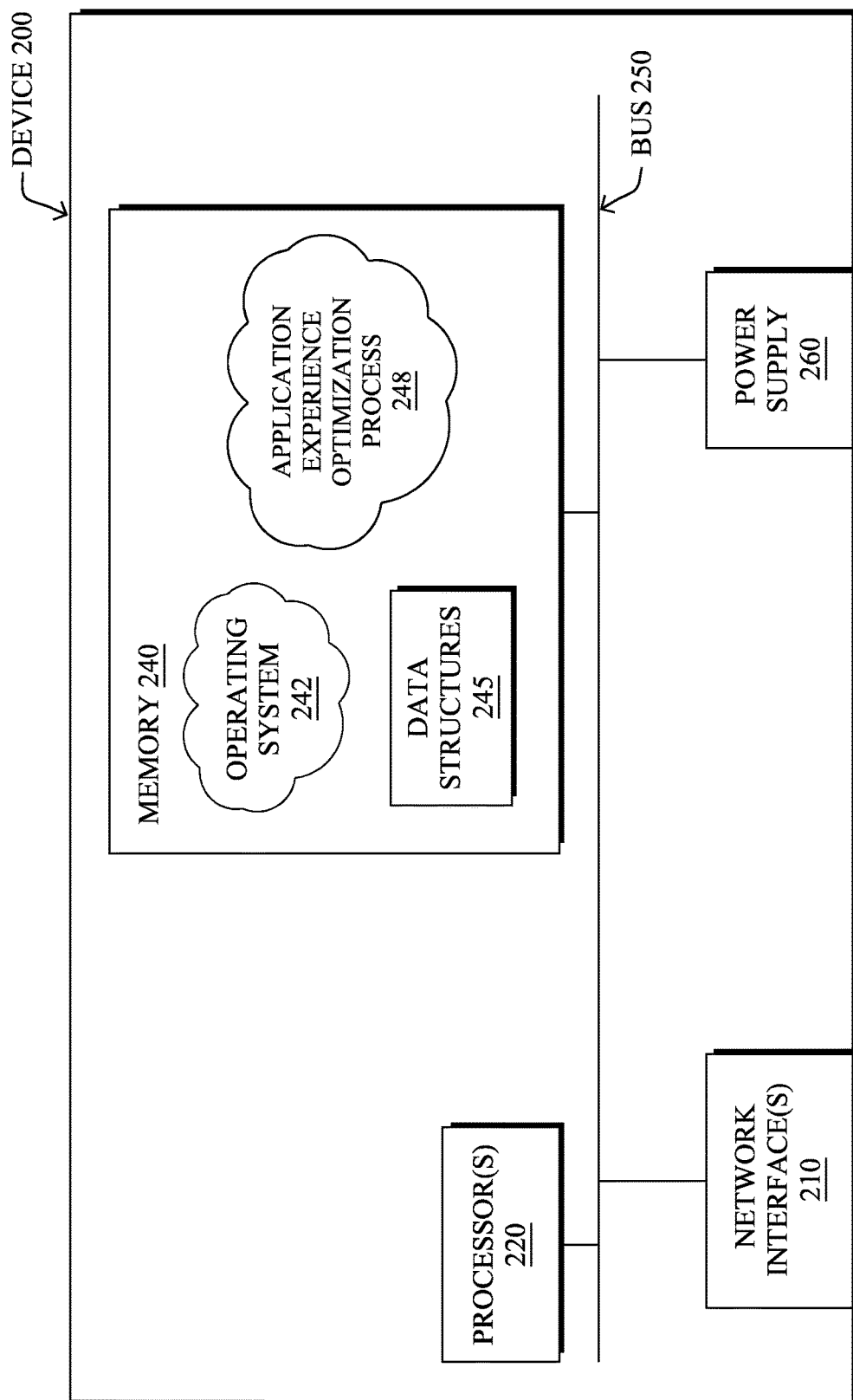
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise an application experience optimization process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, application experience optimization process 248 may include computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, application experience optimization process 248 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, application experience optimization process 248 may include computer executable instructions that, when executed by processor(s) 220, cause device 200 to perform the techniques described herein. To do so, in some embodiments, application experience optimization process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, application experience optimization process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that application experience optimization process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
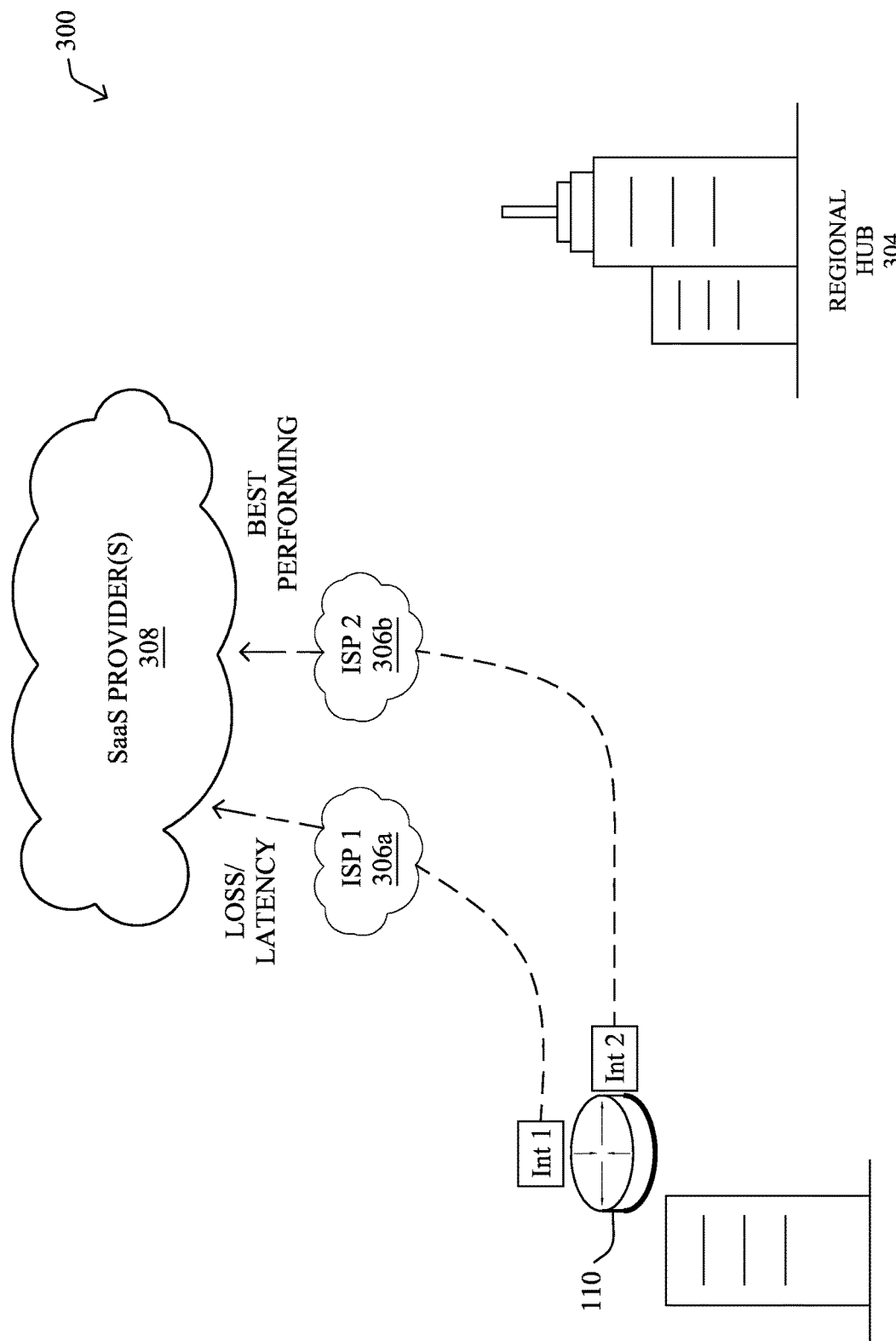
FIGS. 3A-3B illustrate example network deployments.
Figure 3B:
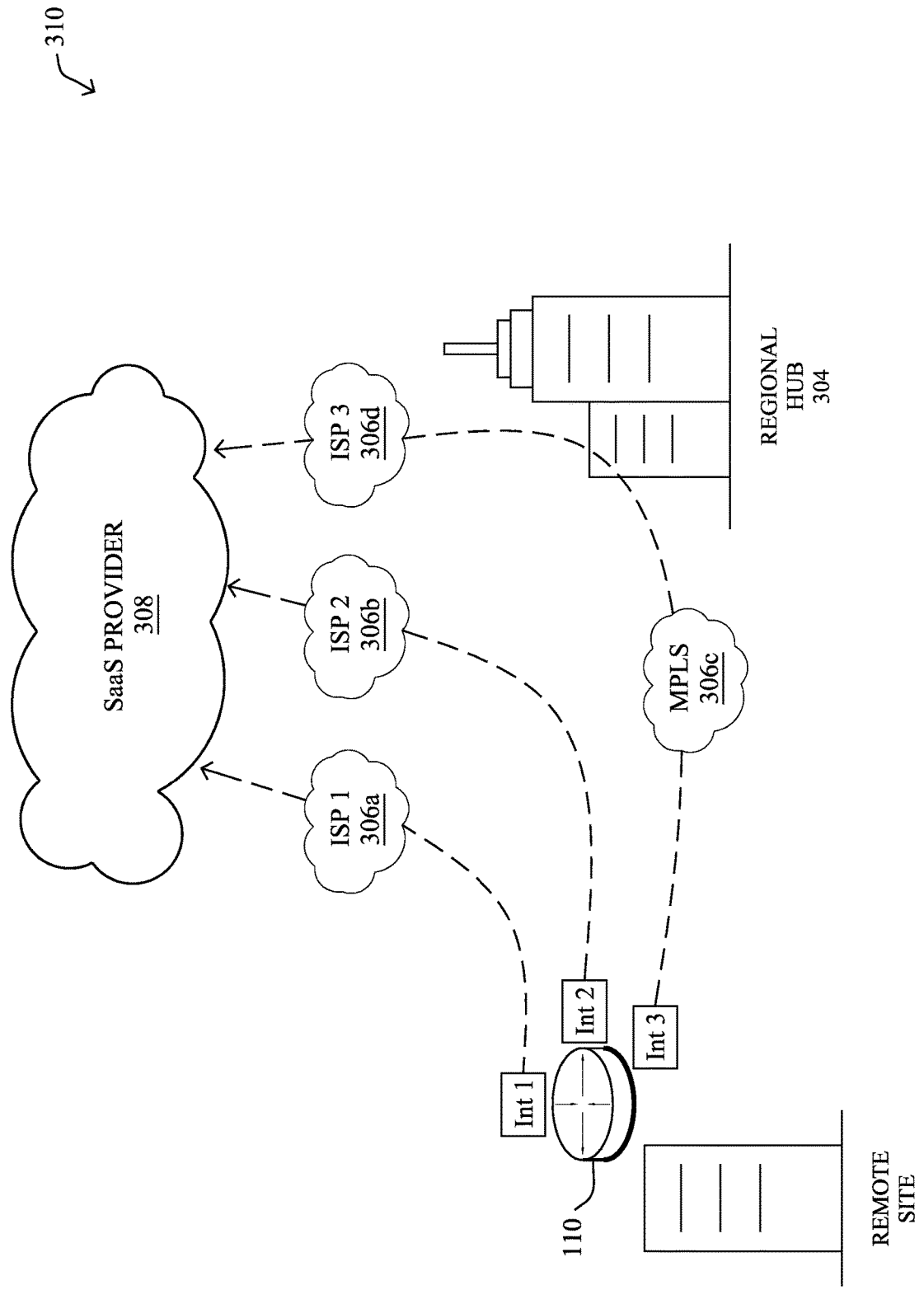

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider (s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet. MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
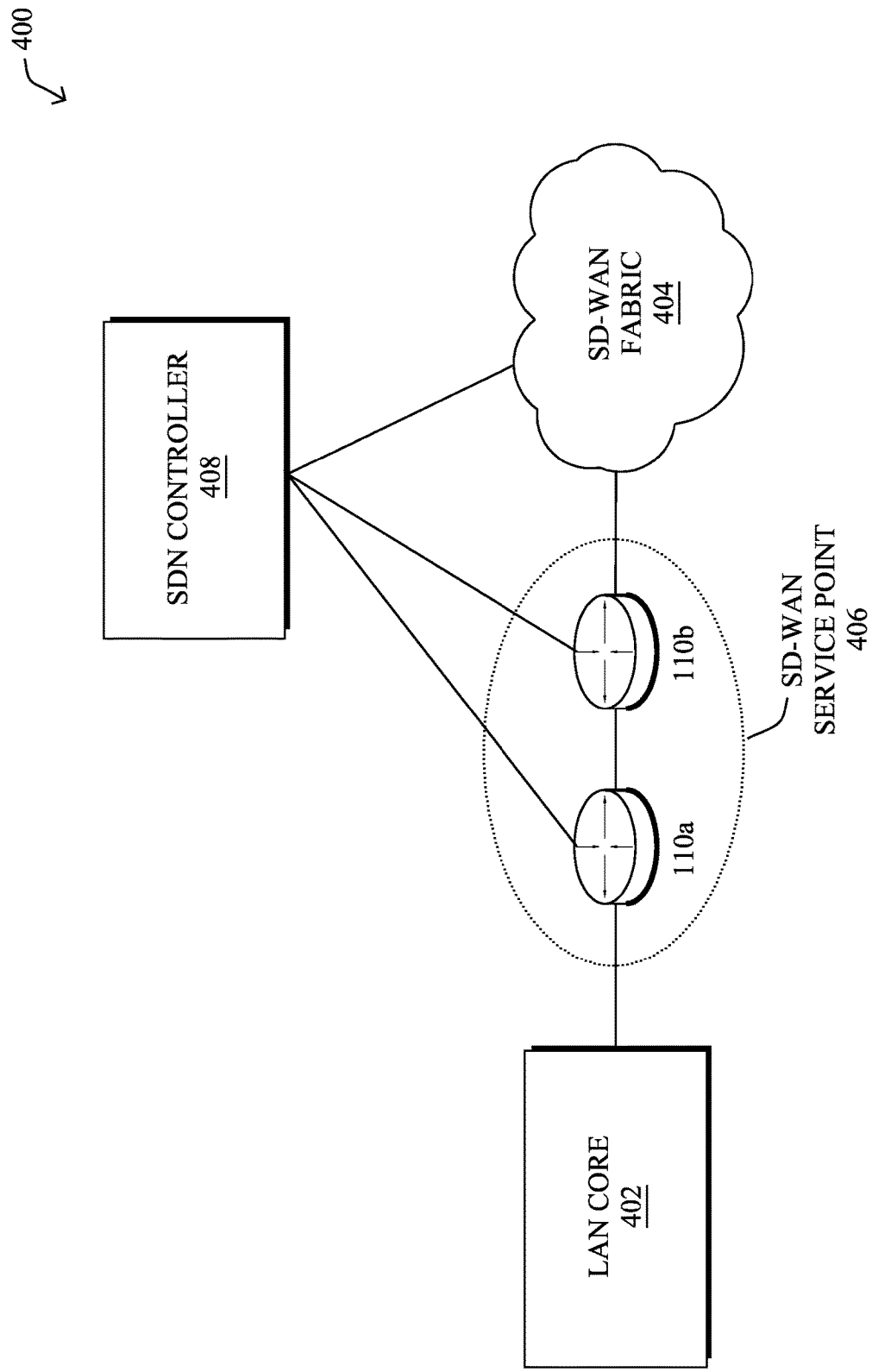
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region. SP, access type, as well as over time with high granularity. The immediate consequence is that the environment is highly dynamic due to:
New in-house applications being deployed;
New SaaS applications being deployed everywhere in the network, hosted by a number of different cloud providers;
Internet, MPLS, LTE transports providing highly varying performance characteristics, across time and regions;
SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path.' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HypefText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing is still entirely reactive: decisions are made using probes that reflect the status of a path at a given time, in contrast with the notion of an informed decision.

SLA failures are very common in the Internet and a good proportion of them could be avoided (e.g., using an alternate path), if predicted in advance.

Figure 4B:
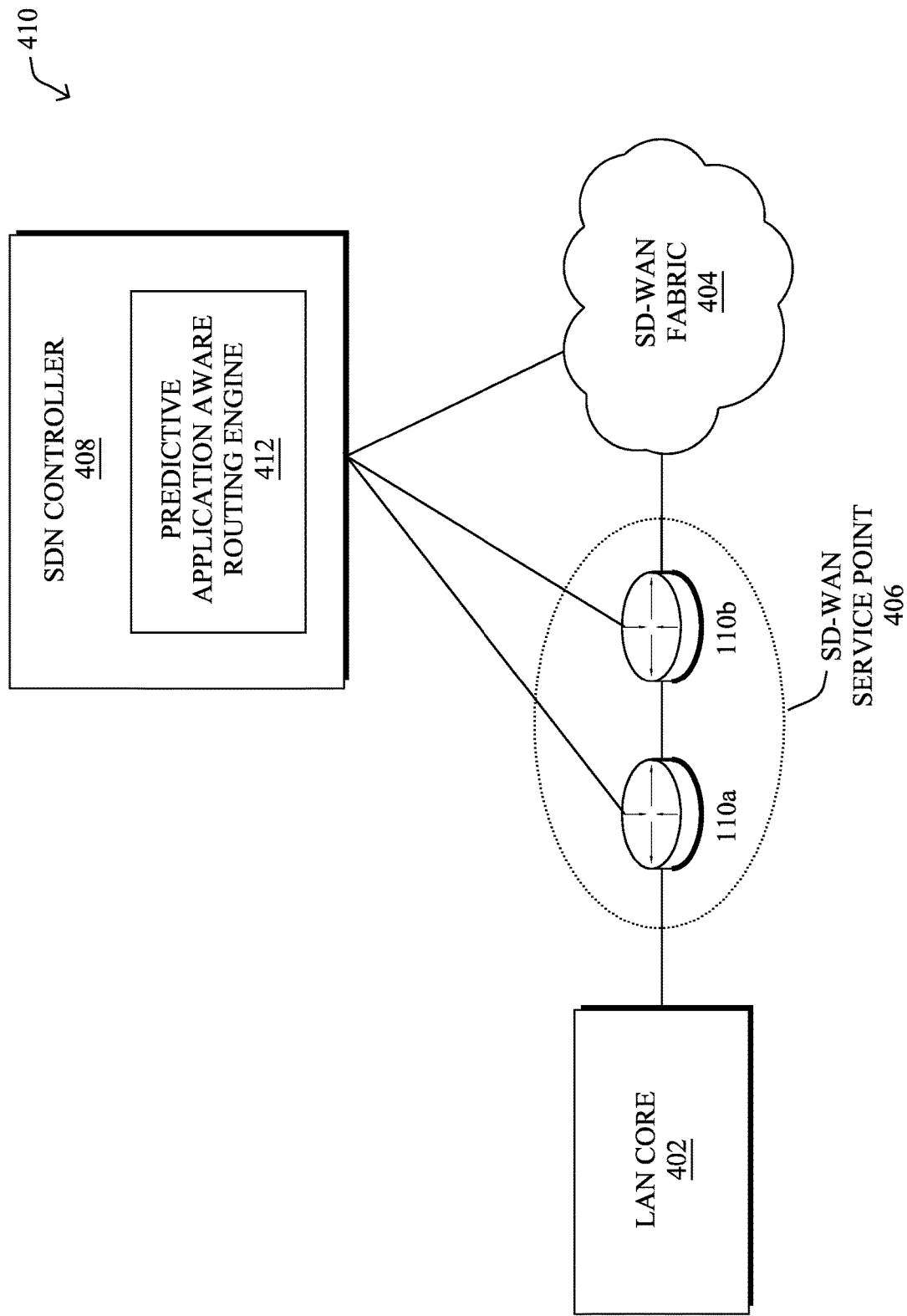

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of application experience optimization process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b. SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In other words, predictive application aware routing engine 412 may use SLA violations as a proxy for actual QoE information (e.g., ratings by users of an online application regarding their perception of the application), unless such QoE information is available from the provider of the online application. In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches." which are typically temporary in nature (e.g., active for a specified period of time) and may also be application-specific (e.g., for traffic of one or more specified applications).

As noted above, enterprise networks have undergone a fundamental transformation whereby users and applications have become increasingly distributed whereby technologies such as SD-WAN, Hybrid Work, and Zero Trust Network Access (ZTNA) have enabled unprecedented flexibility in terms of network architecture and underlay connectivity options. At the same time, collaboration applications, which are often critical for day-to-day business operations, have moved from on-premises deployment to a SaaS cloud delivery model that allows application vendors to rapidly deploy and take advantage of the latest and greatest codecs that can be used to increase robustness of media content.

In this highly dynamic environment, the ability of network administrators to understand the impact of network performance (or lack of) on the QoE of online applications, as well as ensuring that the proper SLAs are satisfied, is becoming increasingly challenging. Indeed, in years past, network metrics were used as a proxy for the true application QoE, with SLAs being set, accordingly. For instance, in the case of a voice application, the usual SLA boundaries are 150 ms for delay, 50 ms for jitter, and maximum of 3% packet loss. Today, such values are not as clear-cut. For example, two real-time voice calls may have different loss thresholds based on the audio codec being used whereby a voice application that uses a lossy codec such as Opus may be resistant until a packet loss of up to 30%, whereas other audio codecs, such as advanced audio coding (AAC), are usually not resilient to such high loss thresholds.

Another factor that demonstrates the shortfalls of relying on SLA thresholds as a proxy for the true application QoE is that SLAs are set without any consideration to the granularity of their underlying measurements. For instance, a path experiencing a constant delay of 120 ms for voice over a period of 10 minutes provides a very different user experience than a path with the same average delay that keeps varying between 20 and 450 ms, despite averaging out to the same over the time period. The dynamics of such metrics is even more critical for packet loss and jitter in the case of voice and video traffic (e.g. ten seconds of 80% packet loss would severely impact the user experience although averaged out over ten minutes would give a low value totally acceptable according to the threshold). Without a doubt, the user experience requires a more subtle and accurate approach in order to determine the networking requirements a path should meet in order to maximize the user satisfaction, capturing local phenomenon (e.g. effects on delay, jitter and loss at higher frequencies) but also telemetry from upper layers (applications).

Traditionally, a core principle of the Internet has been layer isolation. Such an approach allowed layer dependency (e.g. often referred to as layer violation) to be avoided, at a time where a number of protocols and technologies were developed at each layer. More specifically, the Open Systems Interconnection (OSI) model divides networks into seven networking layers:

1. The Physical (PHY) Layer—the layer representing the physical connections between devices
2. The Data Link Layer—e.g., the layer at which MAC addressing is used
3. The Network Layer—e.g., the layer at which the IP protocol is used
4. The Transport Layer—e.g., the layer at which TCP or UDP
5. The Session Layer—e.g., the layer at which a given session between endpoints is managed
6. The Presentation Layer—e.g., the layer that translates requests from the application layer to the session layer and vice-versa
7. The Application Layer—e.g., the highest layer at which the application itself operates This allowed for the design and deployment of new layers (e.g. PHY, MAC, etc.) independent of each other, and allowing the Internet to scale. Still, with modem applications requiring tight SLAs, a cross-layer approach would be highly beneficial to optimizing the QoE of any given online application.

Further, even with a mechanism that is able to accurately estimate the application experience from the perspective of a user, another challenge still exists with respect to selecting the appropriate network action to improve the experience. Indeed, although the effect of specific actions at a given layer of the networking stack on user experience can be qualitatively evaluated, being able to precisely quantify it is often unknown. For instance, determining that voice quality is low along a highly congested path may be relatively easy. However, determining the correct amount of bandwidth to allocate to the path or the appropriate queue weight for the traffic of the application still remains quite challenging.

According to various embodiments, application experience optimization process 248 may leverage the concept of cognitive networking. Instead of taking a siloed approach where networking systems poorly understand user satisfaction, cognitive networks are fully driven by understanding user experience (cognition) using cross-layer telemetry and ground truth user feedback, in order to determine which networking actions can optimize the user experience. To that end, a rich set of telemetry sources are gathered along with labeled user feedback in order to train a machine learning model to predict/forecast the user experience (i.e., the QoE of an online application). Such a holistic approach that is end-to-end across the different network layers is a paradigm shift to how networks have been designed and operated since the early days of the Internet.

As noted above, experimentation has revealed that multiple applications that are of the same or similar type (e.g., provide the same service) can indeed behave differently when the underlying network connectivity is affected by similar impairments. This can be explained by various applications-specific factors such as the processing of media-streams, media codecs, compression capability, and more. As an end user, even though one cannot change the impairment affecting the user's network or the behavior of a given application, one could very well choose the application providing a superior experience. Such an application would be the best of the available applications to handle the specific network impairments that is affecting the user's network. Having such visibility on the type of impairment affecting a section of the network, and the applications that provide the best user experience under such impairments can provide the user with the flexibility to optimize the QoE for their networks.

Application Selection Based on Network Characteristics

The techniques herein introduce an approach to i.) collect as inputs network and application telemetry; ii.) identify impairments affecting the network; iii.) estimate the QoE of various applications under the impairments previously identified; and iv.) inform the user on the most optimal application for each of the network impairments identified. In some aspects, the techniques herein may be built on top of multi-application models that are capable of estimating QoE, given the application metrics for multiple applications using the same prediction model. In further aspects, the analysis on the optimal application could also be used to automate the choice of applications and application configurations, depending on the dynamics of the network impairments.

Illustratively, the techniques described herein may be performed by hardware, software, and/or firmware, such as in accordance with application experience optimization process 248, which may include computer executable instructions executed by the processor 220 (or independent processor of interfaces 210) to perform functions relating to the techniques described herein.

Specifically, according to various embodiments, a device may identify a plurality of impairment scenarios for a network. The device may estimate quality of experience metrics for a plurality of applications accessible via the network for each of the plurality of impairment scenarios. The device may select a particular application from among the plurality of applications based on a comparison between the quality of experience metrics for the plurality of applications. The device may provide an indication for presentation by a user interface that a user should use the particular application from among the plurality of applications.

Figure 5:
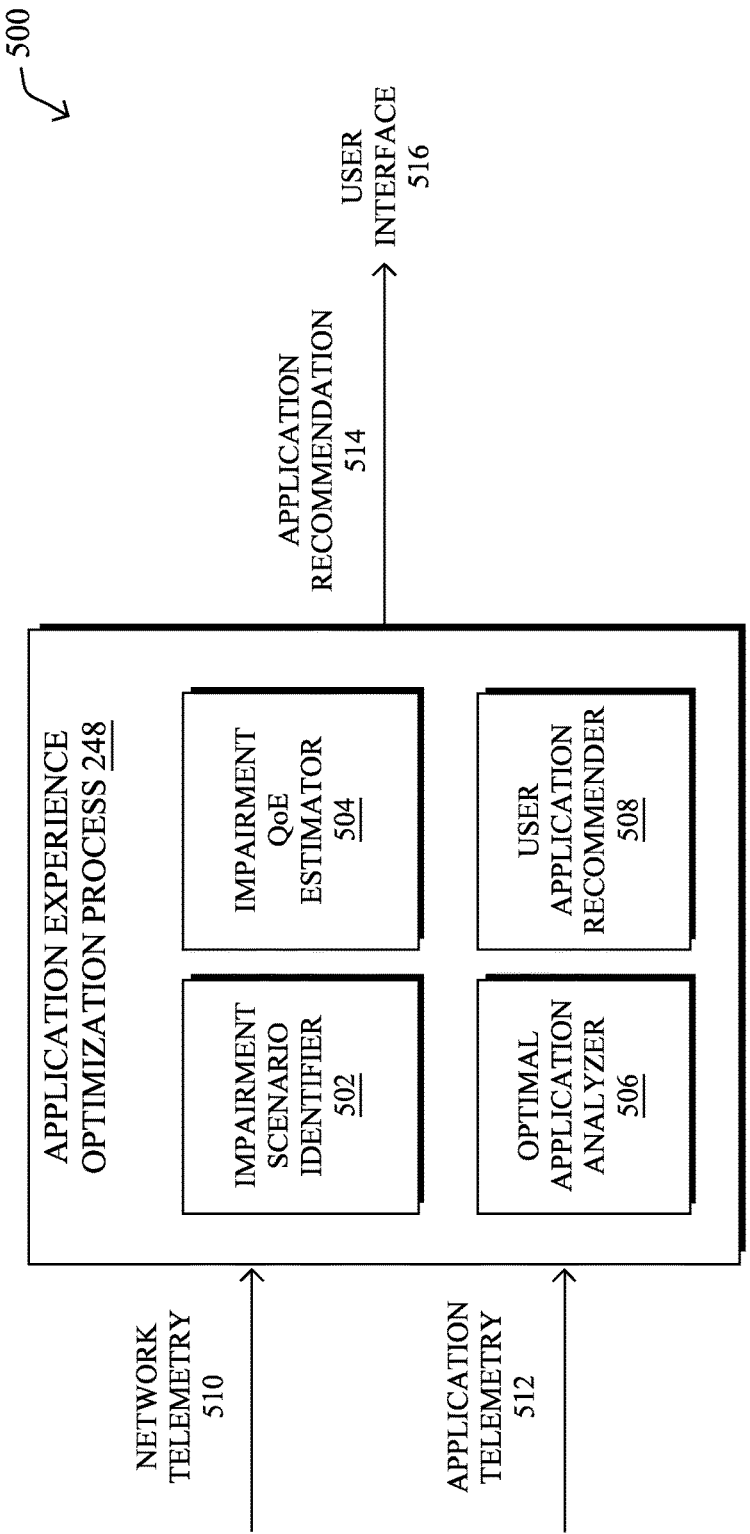
FIG. 5 illustrates an example architecture for application selection based on network characteristics.

Operationally, FIG. 5 illustrates an example architecture 500 for application selection based on network characteristics, according to various embodiments. At the core of architecture 500 is application experience optimization process 248, which may be executed by a controller for a network or another device in communication therewith. For instance, application experience optimization process 248 may be executed by a controller for a network (e.g., SDN controller 408 in FIGS. 4A-4B), a particular networking device in the network (e.g., a router, a firewall, etc.), another device or service in communication therewith, or the like.

As shown, application experience optimization process 248 may include any or all of the following components: impairment scenario identifier 502, impairment QoE estimator 504, optimal application analyzer 506, and/or user application recommender 508. As would be appreciated, the functionalities of these components may be combined or omitted, as desired. In addition, these components may be implemented on a singular device or in a distributed manner, in which case the combination of executing devices can be viewed as their own singular device for purposes of executing application experience optimization process 248.

According to various embodiments, impairment scenario identifier 502 may take as input network telemetry 510 and/or application telemetry 512, to identify the most common impairment scenarios in the network. For example, input network telemetry 510 may indicate performance metrics for the network such as, but not limited to, loss, latency, jitter, bandwidth, resource usage, or the like. In addition, application telemetry 512 may be generated directly by the applications under scrutiny that may also indicate impairment scenarios, such as, but not limited to, the bitrate, framerate, concealment time, bandwidth, video HBH Loss, video E2E, etc. In various embodiments, input network telemetry 510 and application telemetry 512 may take the form of time series of metrics collected throughout a user's session or aggregated per session. In addition, this telemetry may involve both receive (RX) and transmit (TX) telemetry for the user, as well as the application server. To aggregate the metrics, impairment scenario identifier 502 may compute aggregate statistics (e.g., Average, Min, Max, Percentile, etc.) per session, per user, or the like.

In one embodiment, for collaborative applications such as Webex, Zoom, Teams, etc., impairment scenario identifier 502 may collect the telemetry for all the users associated in a session (call) and can also be labeled based on the role they play (Speaker, Listener) in the session.

In yet another embodiment, the impairment scenarios could be artificially introduced in the network in such cases the impairment metrics would be known to the user and can be input directly through a user interface without having to be derived from the telemetry. In other embodiments, the metrics can also contain information on the context of a user session, for example, in voice/video applications metrics such as number of users on the call, number of speakers in the call, etc., which provide insight into the context of the sessions can be used. Such metrics can be useful, given how applications can behave drastically differently for various contexts.

The identification of impairment scenarios by impairment scenario identifier 502 may involve identifying the common impairments that affect a network. In one embodiment, impairment scenario identifier 502 may discretize each of the connectivity metrics into bin, whereby an impairment scenario corresponds to a certain combination of these bins. For example, one impairment scenario may be: loss of 10%-20%, latency of 200 ms-300 ms, and jitter of 50 ms-100 ms, and would cover all instances of the network telemetry falling into these ranges of values.

In another embodiment, impairment scenario identifier 502 may perform clustering on the metric time series or cluster the latent space representation of the metrics. Each of the clusters would then represent an impairment scenario. In addition, impairment scenario identifier 502 may identify the impairment scenarios and assign to them an importance or priority levels, depending on the frequency of their occurrence or the number of user sessions they affect.

In one embodiment, impairment scenario identifier 502 may cluster the impairment scenarios using approaches such as hierarchical clustering. While there may not be individual clusters, impairment scenario identifier 502 may order all the individual impairment scenarios based on their similarity to each other.

According to various embodiments, impairment QoE estimator 504 may take as input the impairment scenarios identified by impairment scenario identifier 502 and associates the QoE estimates for each of the scenarios. To do so, impairment QoE estimator 504 may compute the QoE estimates for multiple applications that are being affected by the same network impairment. These estimates give visibility into the robustness of a particular application toward enduring network impairments without compromising the QoE. The QoE estimates can also be based on model predictions trained to estimate the QoE score or based on real human feedback collected for the sessions affected. In one embodiment the estimated QoE can be an aggregated score based on the QoE of the affected sessions.

In another embodiment, impairment QoE estimator 504 may output a probability distribution of the QoE scores for all the affected sessions. In yet another embodiment, impairment QoE estimator 504 may estimate the QoE for various aspects of the application experience. For example, in voice/video applications, impairment QoE estimator 504 may estimate the QoE for voice media, video media, and the overall acceptability of a call, separately. In some cases, impairment QoE estimator 504 may also estimate the QoE in a manner that provides visibility into the statistical significance of the estimated QoE.

In various embodiments, optimal application analyzer 506 may take as input the outputs of impairment scenario identifier 502 and impairment QoE estimator 504, to assess the application behavior for each impairment scenario. Preferably, optimal application analyzer 506 may do so for different applications of the same type/family/class (e.g., videoconferencing applications such as Zoom, Webex, Teams, Google Talk, etc.). Optimal application analyzer 506 may then assesses the application behavior for each impairment scenario. In turn, optimal application analyzer 506 may make this information available via a custom API such that two or more applications can be compared for the same impairments. This API could be accessed by a user interface, such as user interface 516, to allow a user to better understand which application is best under which scenarios. In addition, optimal application analyzer 506 may also make this information available to user application recommender 508, as described below.

In one embodiment, optimal application analyzer 506 may highlight the various impairment scenarios via user interface 516 that cause the applications to behave in a similar and dissimilar manner. Such a capability can help the user understand the scenarios where all the available applications show QoE degradation and understand the scenarios where one of the applications performs better.

Figure 6:
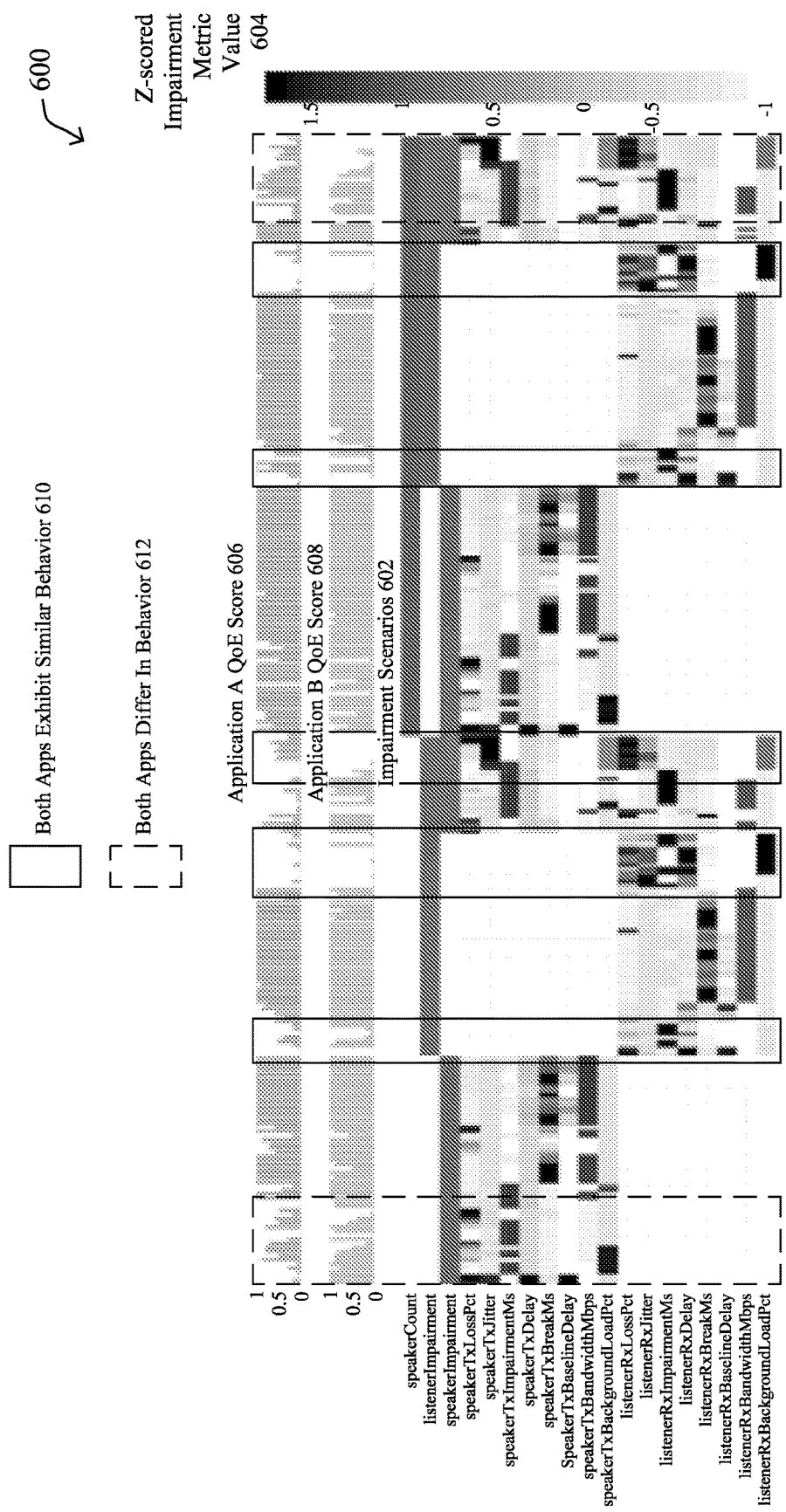
FIG. 6 illustrates an example plot demonstrating different application responses to different network impairment scenarios.

By way of example, FIG. 6 illustrates an example plot 600 demonstrating different application responses to different network impairment scenarios, in various embodiments. For instance, optimal application analyzer 506 may provide plot 600 for display by user interface 516. As shown, plot 600 may include the various impairment scenarios 602 whereby the x-axis represents the individual impairment scenarios ordered by hierarchical clustering, the y-axis represents the metrics that define the network impairment scenarios labeled by speaker/listener, and the heatmap color represents the z-score metric value 604, whereby a darker shading represents a higher value.

In addition, plot 600 may also display the estimated QoE scores 606 for a first application (Application A) and the estimated QoE scores 608 for a second application (Application B) for the different impairment scenarios. Here, plot 600 may also include indicia 610 indicating the QoE estimates and impairment scenarios for which the two applications exhibit similar behaviors. Also, plot 600 may include indicia 612 indicating the QoE estimates and impairment scenarios for which the two applications exhibit different behaviors. The difference in the QoE between applications for each of the impairment scenarios can help an administrator or other user tell how significant a particular application is with respect to handling the impairment scenario.

Figure 7:
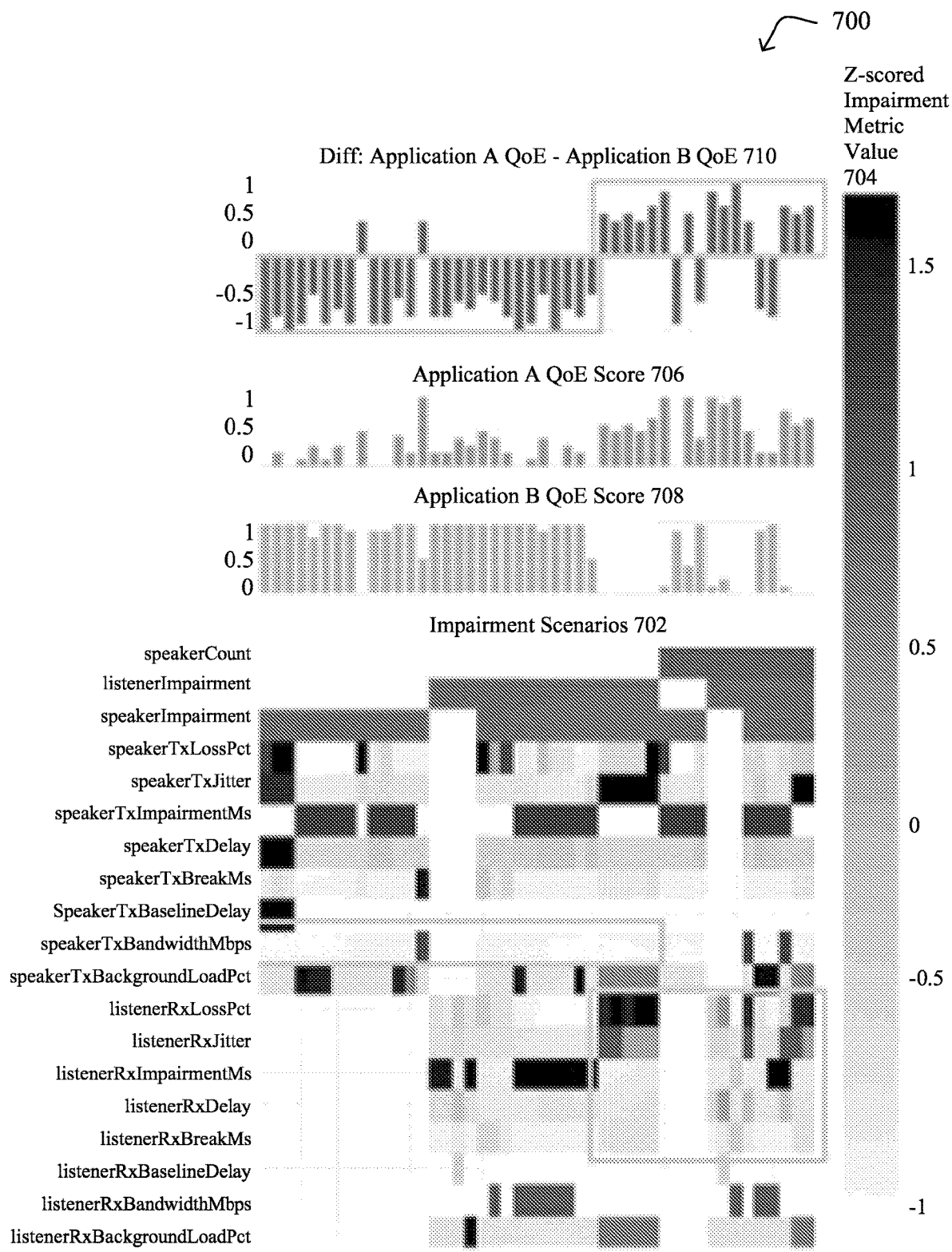
FIG. 7 illustrates a plot demonstrating impairment scenarios where the absolute different in QoE scores is above a threshold.

In one embodiment, the interface could also provide the user with the ability to filter the impairment scenarios by how significant the difference is. By way of example, FIG. 7 illustrates such a filtered plot 700 demonstrates impairment scenarios where the absolute different in QoE scores is above a threshold of 0.5. As shown, plot 700 may include a filtered set of impairment scenarios 702 shaded by their z-score impairment metric values 704, as well as the QOE scores 706, 708 for the two applications, respectively. In addition, plot 700 may also include the differences 710 between the QoE scores 706, 708.

Here, it can be seen that application A is extremely bad at handling bandwidth restrictions on the speaker side. Conversely, application B is extremely bad at handling high values of loss and jitter impairments.

Referring again to FIG. 5, when the QoE estimates for a certain application-impairment pair are not available, optimal application analyzer 506 may provide an estimate of the better application by approximating the QoE estimate for the impairment with missing QoE. For instance, optimal application analyzer 506 may do so by analyzing the QoE estimates for the closest impairment scenario where the information is indeed available.

According to various embodiments, application recommender 508 may be responsible for analyzing network and application telemetry in a live manner and using the output of optimal application analyzer 506 to decide whether a given user should switch from one application to another. To do so, application recommender 508 may take as input flow-level telemetry (e.g., from input network telemetry 510 and application telemetry 512) to identify application usage. In addition, application recommender 508 may also communicate with the APIs from various providers (e.g., Zoom, Webex, Teams, Google Talk) to determine details of the meeting (e.g., a participant list). In turn, application recommender 508 may provide an application recommendation 514 to user interface 516 for review by one or more users. For instance, in the case of a videoconferencing meeting, application recommender 508 may suggest that the participants switch to a different application, if doing so would provide better application experience to the participants of the meeting.

Note that application recommender 508 may send application recommendation 514 to user interface 516 via any number of mechanisms, such as a chatbot, text message, pop-up window, or the like. In addition, application recommendation 514 may also include details as to why application recommender 508 is recommending the selected application (e.g., high loss for participant X will be better handled by Application B). In one embodiment, application recommender 508 may also pre-create a meeting and send the corresponding invites to all participants, such that they can just pick up where they left off.

In another embodiment, application recommender 508 may integrate with a calendaring service, such as Exchange, to dynamically select and recommend the most optimal video conferencing application based on the connectivity of the invitees. Alternatively, application recommender 508 my proactively inform the users that a better option is available for the type of network connectivity that they have. By learning the usage patterns of the users, application recommender 508 could even suggest the best service for the specific type of connectivity they will have at the time of the meeting (e.g., while in transit on 4G/LTE, etc.).

Figure 8:
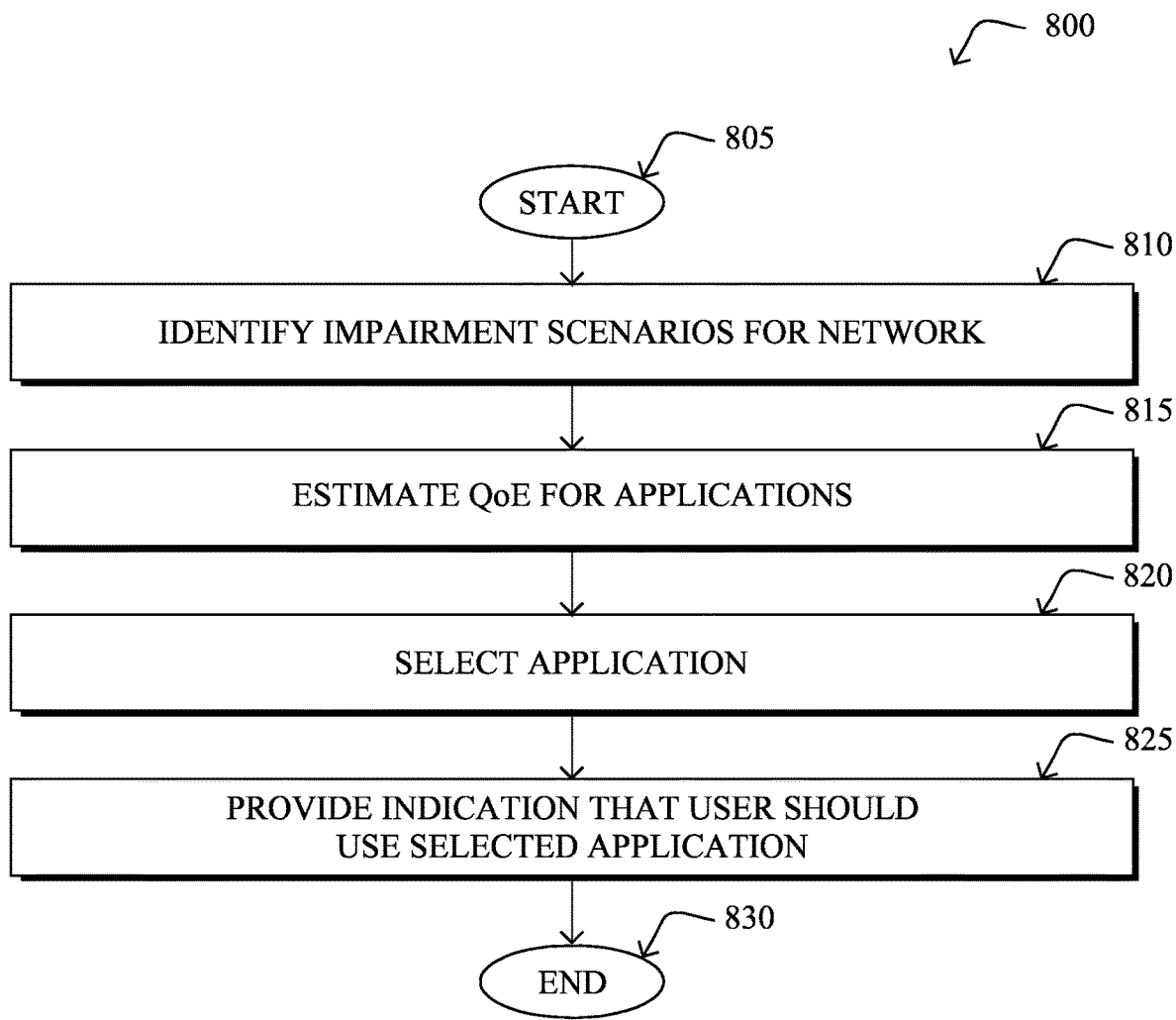
FIG. 8 illustrates an example simplified procedure for application selection based on network characteristics.

FIG. 8 illustrates an example simplified procedure 800 (e.g., a method) procedure for application selection based on network characteristics, in accordance with one or more embodiments described herein. For example, a non-generic, specifically configured device (e.g., device 200), such as a router, firewall, controller for a network (e.g., an SDN controller or other device in communication therewith), server, or the like, may perform procedure 800 by executing stored instructions (e.g., application experience optimization process 248). The procedure 800 may start at step 805, and continues to step 810, where, as described in greater detail above, the device may identify a plurality of impairment scenarios for a network. In some embodiments, the device identifies the plurality of impairment scenarios for the network based in part on network telemetry generated by the network. In a further embodiment, the device identifies the plurality of impairment scenarios for the network based further in part on application telemetry generated by the plurality of applications. In some embodiments, the plurality of impairment scenarios corresponds to different combinations of ranges of values for a plurality of performance metrics associated with the network.

At step 815, as detailed above, the device may estimate quality of experience metrics for a plurality of applications accessible via the network for each of the plurality of impairment scenarios. In various embodiments, the plurality of applications are from a common family of applications. In further embodiments, the plurality of applications are videoconferencing applications. In some embodiments, the device uses a machine learning-based prediction model trained using feedback from users of the plurality of applications to predict the quality of experience metrics for each of the plurality of impairment scenarios.

At step 820, the device may select a particular application from among the plurality of applications based on a comparison between the quality of experience metrics for the plurality of applications, as described in greater detail above. In some embodiments, the device selects the particular application based in part on a location of a client associated with the user in the network. In various embodiments, the device selects the particular application based on a set of users that includes the user (e.g., a set of meeting participants, etc.).

At step 825, as detailed above, the device may provide an indication for presentation by a user interface that a user should use the particular application from among the plurality of applications. In various embodiments, the indication indicates that the user should switch from using another application from among the plurality of applications to using the particular application.

Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for application selection based on network characteristics, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
identifying, by a device, a plurality of impairment scenarios for a network;
estimating, by the device, quality of experience metrics for a plurality of applications accessible via the network for each of the plurality of impairment scenarios;
selecting, by the device, a particular application from among the plurality of applications based on a comparison between the quality of experience metrics for the plurality of applications; and
providing, by the device, an indication for presentation by a user interface that a user should use the particular application from among the plurality of applications.

2. The method as in claim 1, wherein the plurality of applications are from a common family of applications.

3. The method as in claim 1, wherein the device identifies the plurality of impairment scenarios for the network based in part on network telemetry generated by the network.

4. The method as in claim 3, wherein the device identifies the plurality of impairment scenarios for the network based further in part on application telemetry generated by the plurality of applications.

5. The method as in claim 1, wherein the device selects the particular application based in part on a location of a client associated with the user in the network.

6. The method as in claim 1, wherein the device uses a machine learning-based prediction model trained using feedback from users of the plurality of applications to predict the quality of experience metrics for each of the plurality of impairment scenarios.

7. The method as in claim 1, wherein the indication indicates that the user should switch from using another application from among the plurality of applications to using the particular application.

8. The method as in claim 1, wherein the plurality of impairment scenarios corresponds to different combinations of ranges of values for a plurality of performance metrics associated with the network.

9. The method as in claim 1, wherein the device selects the particular application based on a set of users that includes the user.

10. The method as in claim 1, wherein the plurality of applications are videoconferencing applications.

11. An apparatus, comprising:
one or more network interfaces;
a processor coupled to the one or more network interfaces and configured to execute one or more processes; and
a memory configured to store a process that is executable by the processor, the process when executed configured to:
identify a plurality of impairment scenarios for a network;
estimate quality of experience metrics for a plurality of applications accessible via the network for each of the plurality of impairment scenarios;
select a particular application from among the plurality of applications based on a comparison between the quality of experience metrics for the plurality of applications; and
provide an indication for presentation by a user interface that a user should use the particular application from among the plurality of applications.

12. The apparatus as in claim 11, wherein the plurality of applications are from a common family of applications.

13. The apparatus as in claim 11, wherein the apparatus identifies the plurality of impairment scenarios for the network based in part on network telemetry generated by the network.

14. The apparatus as in claim 13, wherein the apparatus identifies the plurality of impairment scenarios for the network based further in part on application telemetry generated by the plurality of applications.

15. The apparatus as in claim 11, wherein the apparatus selects the particular application based in part on a location of a client associated with the user in the network.

16. The apparatus as in claim 11, wherein the apparatus uses a machine learning-based prediction model trained using feedback from users of the plurality of applications to predict the quality of experience metrics for each of the plurality of impairment scenarios.

17. The apparatus as in claim 11, wherein the indication indicates that the user should switch from using another application from among the plurality of applications to using the particular application.

18. The apparatus as in claim 11, wherein the plurality of impairment scenarios corresponds to different combinations of ranges of values for a plurality of performance metrics associated with the network.

19. The apparatus as in claim 11, wherein the apparatus selects the particular application based on a set of users that includes the user.

20. A tangible, non-transitory, computer-readable medium storing program instructions that cause a device to execute a process comprising:
identifying, by the device, a plurality of impairment scenarios for a network;
estimating, by the device, quality of experience metrics for a plurality of applications accessible via the network for each of the plurality of impairment scenarios;
selecting, by the device, a particular application from among the plurality of applications based on a comparison between the quality of experience metrics for the plurality of applications; and
providing, by the device, an indication for presentation by a user interface that a user should use the particular application from among the plurality of applications.

* * * * *

UNITED STATES PATENT AND TRADEMARK OFFICE
CERTIFICATE OF CORRECTION

PATENT NO. : 11,909,803 B1
APPLICATION NO. : 18/205071
DATED : February 20, 2024
INVENTOR(S) : Mukund Yelahanka Raghuprasad et al.

It is certified that error appears in the above-identified patent and that said Letters Patent is hereby corrected as shown below:

In the Specification

Column 9, Line 28 please amend as shown:
QoE by sending HyperText Transfer Protocol (HTTP)

Signed and Sealed this
Fourteenth Day of May, 2024

Katherine Kelly Vidal
*Director of the United States Patent and Trademark Office*